(12) United States Patent
Morgan et al.

(10) Patent No.: US 10,125,331 B2
(45) Date of Patent: Nov. 13, 2018

(54) RENEWABLE OIL REFINING PROCESSES

(75) Inventors: Trevor G. Morgan, Highlands Ranch, CO (US); Tom Vytlacil, Akron, CO (US); Colby Neeley, Sterling, CO (US); Charles Devlin, Yuma, CO (US)

(73) Assignee: Advanced Energy Development, Yuma, CO (US)

( * ) Notice: Subject to any disclaimer, the term of this patent is extended or adjusted under 35 U.S.C. 154(b) by 761 days.

(21) Appl. No.: 12/770,213

(22) Filed: Apr. 29, 2010

(65) Prior Publication Data

US 2011/0265371 A1   Nov. 3, 2011

(51) Int. Cl.
| | |
|---|---|
| *C11B 3/00* | (2006.01) |
| *C11B 3/02* | (2006.01) |
| *C10L 1/02* | (2006.01) |
| *C11B 3/04* | (2006.01) |
| *C11B 3/06* | (2006.01) |
| *C11B 3/12* | (2006.01) |
| *C11B 3/16* | (2006.01) |
| *C11C 3/00* | (2006.01) |

(52) U.S. Cl.
CPC ............ *C10L 1/026* (2013.01); *C11B 3/04* (2013.01); *C11B 3/06* (2013.01); *C11B 3/12* (2013.01); *C11B 3/16* (2013.01); *C11C 3/003* (2013.01); *Y02E 50/13* (2013.01)

(58) Field of Classification Search
CPC ... C10G 2300/1011; Y02E 50/13; C11B 3/00; C11B 3/02
USPC .................................. 44/308; 210/600, 787
See application file for complete search history.

(56) References Cited

U.S. PATENT DOCUMENTS

| | | | | | |
|---|---|---|---|---|---|
| 2,691,011 | A | * | 10/1954 | Perlman | A61K 31/44 536/5 |
| 2,702,813 | A | * | 2/1955 | Sullivan | C11B 3/06 554/190 |
| 2,708,813 | A | * | 5/1955 | Bourgeaux | 65/438 |
| 2,758,122 | A | * | 8/1956 | Clayton | C11B 3/06 552/545 |
| 3,943,155 | A | * | 3/1976 | Young | 554/190 |
| 4,083,969 | A | * | 4/1978 | Inoue | A61K 9/146 514/26 |

(Continued)

FOREIGN PATENT DOCUMENTS

IN  201102028 II   1/2013
WO  WO 2007100658 A2 *  9/2007  ............. C02F 1/683

(Continued)

OTHER PUBLICATIONS

Business Wire Press Release, "Amberlite BD10DRY Specialty Polymer Technology for Biodiesel Purification: A Simple Process and Cost-Effective Solution", Jan. 29, 2007, 2 pages.

(Continued)

*Primary Examiner* — Ellen M McAvoy
*Assistant Examiner* — Ming Cheung Po
(74) *Attorney, Agent, or Firm* — Kilpatrick Townsend & Stockton LLP

(57) ABSTRACT

Processes are described for refining a renewable oil. The processes may include the steps of adding one or more compounds to the renewable oil to produce a soap stock in the renewable oil, and separating at least a portion of the soap stock from the renewable oil. The processes may further include adding a polymer to the separated renewable oil to produce a refined renewable oil.

21 Claims, 3 Drawing Sheets

(56) References Cited

U.S. PATENT DOCUMENTS

| | | | | |
|---|---|---|---|---|
| 6,750,048 | B2 * | 6/2004 | Ruecker | C11B 1/02 424/195.15 |
| 2005/0115897 | A1 * | 6/2005 | Dueppen | C11B 1/00 210/634 |
| 2008/0184616 | A1 * | 8/2008 | Misra et al. | 44/308 |
| 2008/0269513 | A1 * | 10/2008 | Sarangan et al. | 554/13 |
| 2009/0199460 | A1 * | 8/2009 | Munson | B01D 15/00 44/308 |

FOREIGN PATENT DOCUMENTS

| | | | | |
|---|---|---|---|---|
| WO | WO-2007100658 | A2 * | 9/2007 | C02F 1/683 |
| WO | WO 2007100658 | A3 * | 1/2008 | C02F 1/683 |

OTHER PUBLICATIONS

McMurrough, et al., "Adsorption by Polyvinylpolypyrrolidone of Catechins and Proanthocyanidins from Beer," *J. Agric. Food Chem.* 1995, 43, 2687-2691.

Gopal, et al., "PVPP—the route to effective beer stabilization," *Brewers' Guardian*, May 2000, 10 pages.

Bamforth, Charles W., "Beer: A Quality Perspective", Academic Press, Copyright © 2009 Elsevier Inc., p. 149. Retrieved from: https://books.google.com/books?id=2UqCFxskEnMC&pg=PA144&lpg=PA144&dq=acid+not+removed+by+pvpp&source=bl&ots=flbixZB7_V&sig=9NcJxmpzh_9Q7J7S-aPDmkJKoqw&hl=en&sa=X&ved=0ahUKEwip17qblOLPAhWl3iwKHQ87DDsQ6AEILzAG#v=onepage&q=acid%20not%20removed%20by%20pvpp&f=false.

Van Alfen, Neal K., "Encyclopedia of Agriculture and Foods Systems: Analyses of total phenolics, flavonoids, and total antioxidant activities in foods and dietary supplements.", Academic Press, Copyright © 2014 Elsevier Inc., p. 307, para 2. Retrieved from: https://books.google.com/books?id=Y-VfAwAAQBAJ&pg=PA307&lpg=PA307&dq=acid+not+removed+by+pvpp&source=bl&ots=tzU7YbNy-c&sig=-HFce1hrVpwLlito7Z5nL5joFCc&hl=en&sa=X&ved=0ahUKEwip17qblOLPAhWl3iwKHQ87DDsQ6AEIHTAB#v=onepage&q=acid%20not%20removed%20by%20pvpp&f=false.

Winnewiser, et al., "Influence of (+)-catechin and Ferulic acid on formation of beer haze." *Journal of the Institute of Brewing*, vol. 107, No. 1, 2001, p. 59. Retrieved from: http://onlinelibrary.wiley.com/doi/10.1002/j.2050-0416.2001.tb00080.x/pdf.

\* cited by examiner

RENEWABLE OIL REFINING PROCESSES

BACKGROUND OF THE INVENTION

Renewable oils, which include vegetable and animal oils, are well known for their nutritive and cooking value. Increasingly, they are also becoming an alternative fuel source for transportation and manufacturing. Because renewable oils are generally produced though biological processes that directly or indirectly remove carbon from the atmosphere, they are considered carbon neutral. In contrast, fuels derived from non-renewable sources like coal and petroleum add carbon dioxide and other pollutants to the atmosphere without a corresponding removal step. Heightened concerns about global warming and other environmental problems have spurred interest in replacing non-renewable fuels with ones derived from renewable sources such as renewable oils.

Renewable oils are typically extracted from their natural sources in an unrefined form that is sometimes referred to as crude oil. These crude oils include a variety of impurities, such as gums, waxes, phosphatides, sterols, and free fatty acids, among other impurities. For most applications, at least a portion of these impurities have to be removed or converted into something else before the renewable oil can be used. For example, crude vegetable oils are typically degummed, dewaxed, bleached, and deodorized before being used as a food ingredient or for cooking.

In many processes where renewable oils are used to make transportation fuels, reducing the levels of free fatty acids and other impurities in the crude oil is important. For example, the process of converting renewable oils into biodiesel fuel involves the reaction of triglycerides with alcohols to produce fatty esters. In many biodiesel processes the presence of even small quantities of free fatty acids produced by the degradation of the triglycerides can create significant reductions in the yield of biodiesel.

Unfortunately, conventional processes for removing free fatty acids and other impurities from crude renewable oil often remove significant quantities of triglycerides and other desired components, as well as create a large stream of waste products. For example, conventional methods for removing free fatty acids often involve mixing the crude oil with several rounds of aqueous solutions of acid and/or base. The multiple washings extract a significant quantity of the oil with the free fatty acids, and also create a large waste stream. Subsequent pH adjustments consume additional process chemicals and create even more waste. Moreover, the separation of the waste stream from the purified oil by, for example, centrifugation, distillation, filtration, etc., requires significant expenditures of energy that decrease the net energy yield in the final fuel product. Thus, there is a need for improved purification processes for renewable oils that reduce the materials and energy expended by the process. This and other challenges are addressed in the present application.

BRIEF SUMMARY OF THE INVENTION

Processes for purifying renewable oils, such as oils derived from vegetables and animals, are described. These processes include adding a polymer to crude oil and/or partially refined oil that binds with impurities in the oil such as free fatty acids, among other impurities. The impurity-containing polymer may be separated from the liquid oil. The separated polymer, once removed, may be disposed of as waste or incorporated into other materials such as animal feed.

The use of the polymer to remove impurities from a renewable oil reduces the volume of the waste stream generated by conventional purification (e.g., refining) processes. By reducing the concentration of impurities with the polymer, fewer aqueous washings of the oil are needed, and less volume of water and chemicals are needed for the washings. Moreover, in some instances the waste stream generated by the polymer may be converted into an edible feedstock instead of being disposed of as chemical waste.

Embodiments of the invention include processes of refining a renewable oil. The processes may include the steps of adding one or more compounds to the renewable oil to produce a soap stock in the renewable oil, and separating at least a portion of the soap stock from the renewable oil. The processes may further include adding a polymer to the separated renewable oil to produce a refined renewable oil.

Embodiments of the invention may also include additional processes for refining a renewable oil. These processes may include the step of removing a first portion of free fatty acids, among other impurities, from a starting renewable oil to produce a partially refined oil. They may further include the step of removing a second portion of free fatty acids, among other impurities, from the partially refined oil to produce a refined renewable oil. The removal of the second portion of free fatty acids, among other impurities, may include adding a polymer to the partially refined oil.

Embodiments of the invention may still further include additional processes for refining a renewable oil. The processes may include the step of removing a first portion of free fatty acids, among other impurities, from a starting renewable oil to produce a partially refined oil. They may also include the step of removing a second portion of free fatty acids, among other impurities, from the partially refined oil to produce a refined renewable oil. The removal of the second portion of free fatty acids, among other impurities, may include adding a polymer to the partially refined oil.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Processes for refining renewable oils are described that include the use of polymers to absorb impurities in the unrefined, crude renewable oil. In some embodiments, the impurity containing polymers are only slightly soluble or insoluble in the oil, and may be removed as a separate phase from the purified oil. The separated polymer may be an edible polymer that can be incorporated into an animal feedstock instead of disposed as chemical waste.

The polymers may absorb and remove impurities from the renewable oil that would otherwise have to be removed by conventional refining techniques such as washing, distillation, etc. While the present processes may combine these conventional techniques with polymer purifications, the removal of at least some of the impurities using the polymer reduces the number of washings, distillations, etc., required to achieve a desired concentration of impurities in the refined renewable oil.

The term "refining" as used in present application may include the removal of gums (e.g., degumming) and waxes (e.g., dewaxing). It may also include the removal of color impurities (e.g., bleaching) and odor causing impurities (e.g., deodorizing), among other kinds of impurities. The term may also include converting components of the oil to more stable compounds, such as hydrogenation processes for unsaturated organic compounds. Impurities removed by the present refining process may include, without limitation, free fatty acids (FFAs), phosphatides (e.g., hydratable phosphatides, non-hydratable phosphatides (NHPs), etc.), metal ions (e.g., iron, calcium), waxes, oxidation products, color agents, moisture, volatile organic compounds, and solid particles such as dirt (e.g., silicates) and other insoluble materials.

Exemplary free fatty acids (FFAs) that may be removed include saturated fatty acids, unsaturated fatty acids, and polyunsaturated acids, among others. The fatty acids may include a carbon backbone from about 4 to about 30 carbon atoms in size. Examples of these fatty acids may include palmitic acid, stearic acid, oleic acid, linoleic acid, linolenic acid, arachidonic acid, erucic acid, caproic acid, caprylic acid, capric acid, lauric acid, myristic acid, eicosapentaenoic acid (EPA), docosahexaenoic acid (DHA), 5-eicosenoic acid, behenic acid, butyric acid, alpha-linolenic acid, gamma-linolenic acid, and conjugated linoleic acid, among other fatty acids.

Exemplary Refining Methods

Figure 1:
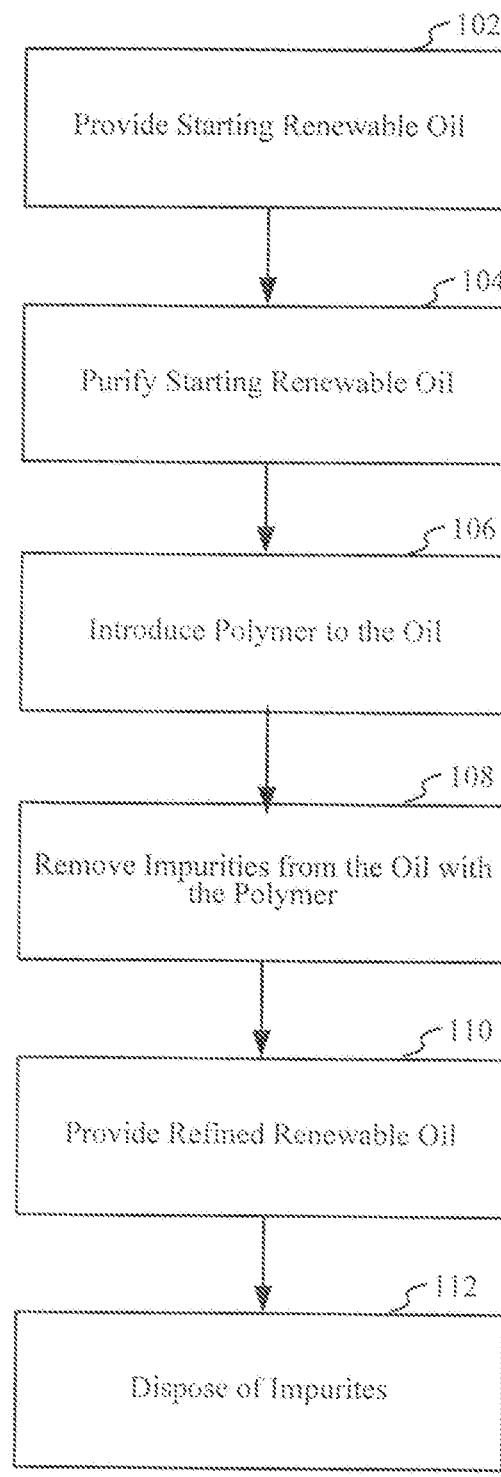
FIG. 1 is a flowchart illustrating selected steps in a process for refining a renewable oil according to embodiments of the invention.

FIG. 1 shows a flowchart with selected steps in a process 100 of refining a renewable oil. The process 100 may include the step of providing a starting renewable oil. The starting renewable oil may include oils that can be produced by natural processes at a rate comparable or faster than their rate of consumption. In contrast, non-renewable oils such as petroleum are produced over the course of thousands to millions of years, a much lower production rate than the rate at which they are consumed. Examples of starting renewable oils include oils derived from biological organisms such as animals and vegetables, among other organisms. Examples of vegetable oils may include corn oils, soybean oils, sunflower seed oils, palm oils, palm kernel oils, rapeseed oils, olive oils, peanut oils, canola oils, hazelnut oils, castor oils, coconut oils, linseed oils, safflower oils, hempseed oils, mustard oils, cottonseed oils, grape seed oils, rice bran oils, sesame oils, among other types of vegetable oils. Examples of animal oils may include oils derived from butterfat, milk fat, lard, lanolin, and tallow (e.g., beef tallow, mutton tallow, etc.), among other kinds of animal oils.

The starting renewable oil may also be described by the chemical compounds they contain. For example, many renewable oils contain a significant amount of triglycerides and may be referred to as glyceride and/or triglyceride oils. Renewable oils and their products may also be referred to as oleochemicals to signify their derivation from plant and/or animal fats, as distinguished from petrochemicals that are derived from petroleum.

The provided renewable oil may undergo a first purification step 104 (i.e., refining step) to remove at least a portion of the phosphatides, FFAs and other impurities in the oil. These other impurities may including metal ions, waxes, oxidation products, color agents, volatile organic compounds, waxes and/or solid impurities, among other impurities. The removal of these impurities may be referred to as a degumming and/or dewaxing step.

Embodiments of the first purification step 104 may include water degumming (e.g., exposing the crude oil to hot water), acid degumming (e.g., exposing the crude oil to aqueous solutions of phosphoric acid or citric acid), acid refining (e.g., exposing water degummed oil with an aqueous acid solution, then raising the pH with an alkaline compound and optionally centrifuging to separate residual gums and FFAs), dry degumming (e.g., acid degumming with reduced amount of water combined with bleaching), enzymatic degumming (e.g., catalytic modification of phospholipids and/or other compounds using enzymes to produce water soluble compounds that may be washed away), chelation degumming (e.g., contacting the crude oil with one or more chelating agents such as ethylenediaminetetraacetic acid (EDTA), an amino acid such as aspartic acid, an organic acid such as malic and/or fumaric acid, etc.), filtration degumming (e.g., retaining impurities such as phospholipids from the crude oil using impurity impermeable membranes, among other filtration/ultra-filtration processes), and cavitation degumming (e.g., exposing the crude oil to energy released upon implosion and/or pulsation of cavitation features to alter the physical and/or chemical properties of the oil), among type of degumming.

In one example, purification step 104 may include raising the temperature of the impure renewable oil (e.g., crude oil) and adding an aqueous acid (e.g., phosphoric acid) to the oil. The combination of the oil and acid may be mixed, and the temperature of the mixture may be raised to a level (e.g., about 160° F. to about 170° F.) where the acid efficiently reacts with the phosphatides and other impurities to cause them to form precipitates in the oil.

A base (e.g., sodium hydroxide) may then be added to the oil to react with the non-hydradatable lipids and free fatty acids in the oil. The addition of the base will cause a soap stock to form and separate from the oil phase of the mixture. The aqueous soap stock is more dense than the oil, which will float on top of the soap stock phase. The precipitating gums, phosphatides, lipids and FFAs will accumulate in the soap stock phase to leave a partially purified oil phase. The soap stock phase may then be separated from the oil phase by, for example, centrifugation.

The first purification step 104 removes a significant portion of the FFAs and other impurities from the starting crude oil, but usually does not reduce their concentrations to levels desired for using the refined oil as a feedstock in applications such as ethanol and biodiesel production. Thus, method 100 continues the oil purification process by introducing a polymer to the separated renewable oil in step 106.

Exemplary polymers may include those made from polymeric materials that are insoluble or only slightly soluble solids in the oil, as well as polymeric materials that are liquid phase and/or soluble in the oil. The polymers binds to FFAs and other impurities dissolved and/or suspended in the separated renewable oil. The polymers may also include biodegradable and/or edible polymers that may be safely consumed by people, livestock, and/or other animals. The edible polymers may further provide nutritive value when consumed. Examples of the polymeric material may include organic polymers such as polyvinylpyrrolidone (PVP) polymers which are soluble in water and other polar solvents, but substantially insoluble in non-polar solvents such as glyceride oils. Commercially available PVP polymers include those sold under the tradename Polyclar® by International Specialty Products, Inc.

The polymer may be in the form or a dry powder, fluid slurry, gelatinous phase, and liquid or solution, among other forms, when introduced to the separated oil. When the polymer includes solid particles, the average size of the particles may be selected to form a mixture, colloid, dispersion, and/or suspension with the separated oil. For example, the polymer may be introduced as a dry powder to the oil, where the average particle size of the powder is selected to form a suspension that eventually separates from the oil as sediment. The polymer may also take the form of a larger bulk solid that passes through the separated oil.

In some examples, the polymer may include two or more materials that are selected for their binding affinity to specific classes of impurities. For example, the polymer may include a first material with a strong binding affinity to FFAs among other impurities and a second material with a strong binding affinity for non-hydratable phosphotides among other impurities. When a plurality of materials are used for the polymer, they may be introduced simultaneously to the separated oil or sequentially. When introduced sequentially, the first material may still be present in the oil during the introduction of the second material, or the first material may have already been separated before the introduction of the second material.

The polymer may be introduced as the oil is being stirred, agitated (e.g., sonicated) or otherwise mechanically activated to provide a more homogeneous distribution of the polymer in the separated oil. The temperature of the oil may also be set to provide an oil viscosity that increases the mixing and contact between the polymer and the impurities in the oil. For example the oil may be set to a temperature of about 60° F. to about 80° F. prior to the introduction of the polymer, and maintained within that temperature range for the duration of the time that the polymer is mixed with the oil.

The polymer binds to impurities in the separated oil to remove a second portion of the impurities from the oil 108. For example, when the polymer is a PVP polymer, it binds to polar impurities in the oil such as FFAs and other impurities, which further reduces the FFA concentration in the oil.

The polymers may then be separated from the oil to produce a refined renewable oil 110. The separation may be performed by centrifugation and/or filtration, among other separation techniques. The refined renewable oil may have a concentration of one or more impurities that is at or below a threshold concentration level. For example, if the refined renewable oil is being used as a feedstock for the production of biodiesel, then the concentration of FFA impurities and other impurities in the refined oil are at or below the threshold for producing a biodiesel fuel that meets regulated purity standards.

The impurity-containing separated polymer and other impurities (e.g., impurities generated from the first purification step) may be disposed of 112. Disposal may include permanent disposal of the impurities in a landfill and/or other waste disposal site. Alternatively, some or all of the impurities may be incorporated into other useful materials. For example, the impurity-containing polymer and/or impurities generated in other purification steps may be incorporated into edible materials for consumption by animals, such as an animal feedstock.

While method 100 shows a single refining step involving the polymer, it should be appreciated that multiple refining cycles with the polymer may be performed. For example, the introduction of a second, third, fourth, etc., amount of the polymer may be performed to remove one or more of the impurities down to a requisite concentration or lower. In some examples, polymer from an earlier purification step may be recycled for use in a subsequent purification step. If the polymer still has capacity to bind impurities after the first polymer purification step, then the recycling process may simply involve reintroducing the separated polymer to the oil.

Figure 2:
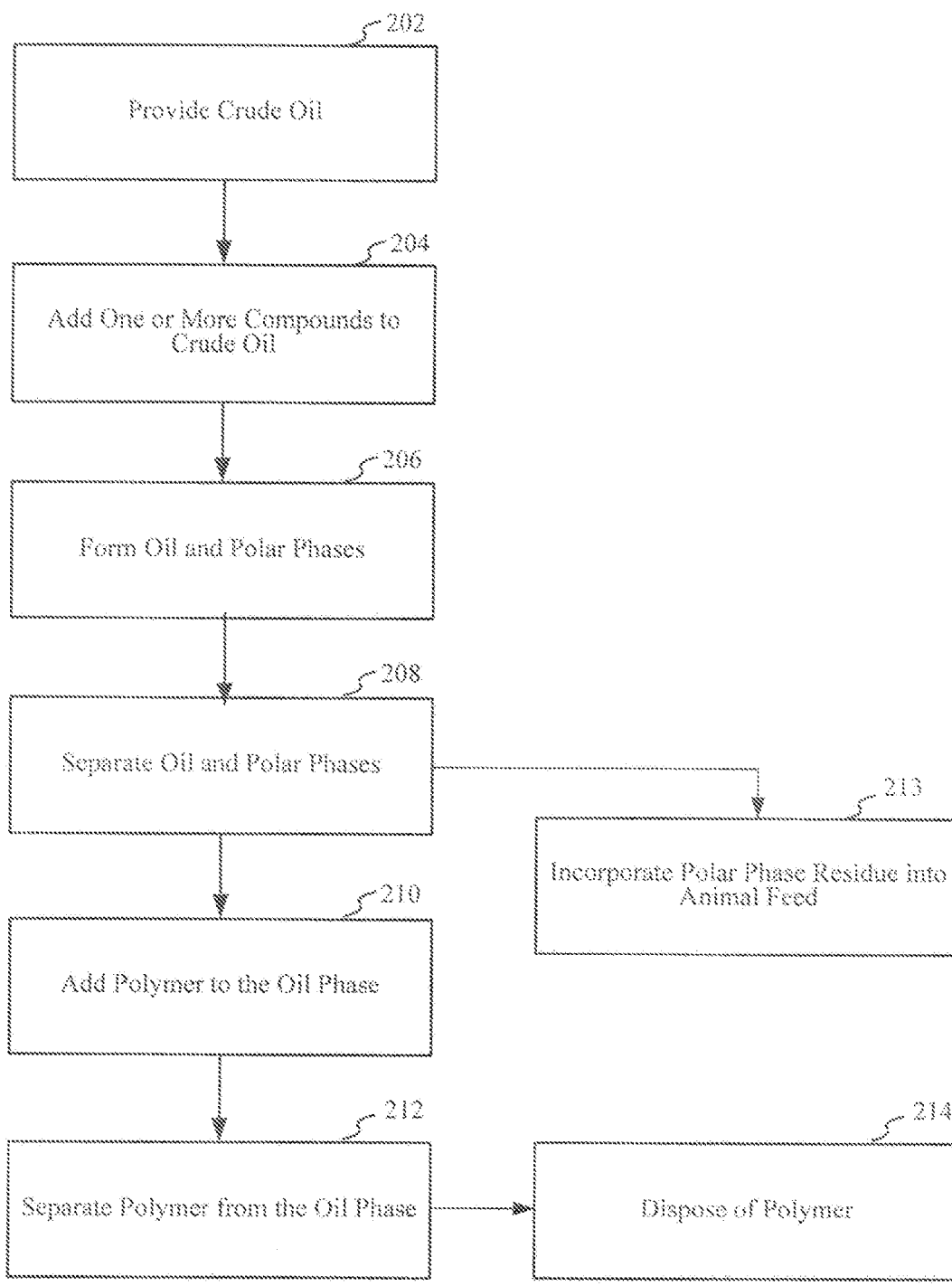
FIG. 2 is a flowchart illustrating selected steps in a process of refining a renewable oil and incorporating refining materials into an animal feedstock according to embodiment of the invention.

Referring now to FIG. 2, a flowchart illustrating selected steps in a process 200 of refining a renewable oil and incorporating the refining materials into an animal feedstock according to embodiments of the invention is shown. The method 200 includes providing a starting renewable oil (e.g., a crude oil) 202, and adding one or more compounds to the starting oil 204. The one or more compounds may include water, acid and/or base that starts the process of degumming the oil. Exemplary acids may include strong acids such as phosphoric acid, hydrochloric acid, nitric acid, and sulfuric acid, among others. Acids may also include organic acids such as citric acid, oxalic acid, tartaric acid, and maleic acid, among other organic acids. Exemplary bases may include alkali metal hydroxides such as sodium hydroxide and potassium hydroxide, alkali earth metal hydroxides such as magnesium hydroxide and calcium hydroxide, bicarbonate salts such as sodium bicarbonate, ammonia, and organic bases, among other bases. The acids and bases may be added directly to the crude oil, or may be first dissolved in water to form aqueous solutions.

When more than one compound is added to the starting oil, the compounds may be added simultaneously or sequentially. Sequential addition may include adding a first compound to remove a first set of impurities from the oil, and the adding a second compound to remove a second set of impurities from the oil. This process may be repeated for sequential additions of a third, fourth, fifth, etc., compound or compounds depending on the type of starting oil and types of impurities being removed. Examples of sequential addition may include first adding an acid to the starting oil to remove impurities such as hydratable phosphatides and other impurities. This is followed by the addition of a base to remove FFAs and NHPs among other impurities.

The addition of the one or more compounds to the starting renewable oil may cause the formation of a polar aqueous phase capable of separating from the non-polar oil phase 206. Embodiments of the polar aqueous phase may include a soap stock that forms when an aqueous base solution (e.g., aqueous sodium hydroxide) is mixed with the oil. Polar impurities in the oil phase will be attracted to the polar aqueous phase, and may dissolve and/or disperse into the aqueous phase. The addition of the base may increase the polarization of impurities such as FFAs and NHPs, among other impurities, causing them to precipitate from the oil phase and migrate to the aqueous phase.

The aqueous and oil phases may be in contact for a period of time when there is a significant transfer of impurities from the oil phase to the aqueous phase. This period may last from about 1 minute to about 30 minutes or more (e.g., about 5 minutes to about 8 minutes; about 8 minutes to about 10 minutes; etc.). During this time the phases may be shaken, stirred, or otherwise mechanically agitated to increase the contact between the phases and the transport of impurities to the aqueous phase. For example, the phases may be mixed in a mixing unit operating at about 800 to about 1000 rpm. The temperature may also be adjusted during the period of contact between the phases. For example, when impurities such as hydratable phosphatides are mixed with an aqueous acid phase during an acid degumming process or mixed with an aqueous alkaline (i.e., basic) phase during removal of impurities such as FFAs and NHPs, the temperature of the mixture may be set to about 100° F. to about 200° F. (e.g., about 160° F. to about 170° F.) during this process.

After the aqueous and oil phases have been in contact for a period of time, the aqueous phase is separated and removed from the oil phase 208. The separation of the aqueous phase may be done by centrifugation, filtration, decantation, and/or a variety of other fluid separation techniques. The separation may occur in multiple stages, where for example a first stage separates the majority of the material, and a second stage separates residual material. Examples of a multiple stage separation may include a first centrifugation separation to separate the majority of the aqueous phase from the oil phase, followed by a second vacuum drying stage to remove at least a portion of the residual moisture from the separated oil phase.

The impurities in the separated aqueous phase may be disposed of by incorporating some or all of them into an animal feed 213. The impurities may be digestible by animals such as livestock, an even people, and may have nutritive value for the animals. For example, the impurities may be incorporated into feed for cattle, pigs, chickens, lamb, and/or other kinds of livestock. In some embodiments, the impurities may be combined with the polymer and impurities captured in subsequent purification/separation steps involving the polymer materials to produce the feedstock. Alternatively, the impurities may be permanently disposed of by transfer to a permanent waste disposal site, such as a landfill.

The separation step 208 leaves a partially refined oil phase that may still contain significant levels of impurities. A polymer may be added to the partially refined oil 210 to further purify the oil. The polymer may be selected for its binding affinity to polar molecules that remain in the oil as impurities. Examples of these polar impurities include residual FFAs, among other impurities.

The polymer may be added as a dry powder or slurry (among other forms) to the partially refined oil. The addition of the polymer may be accompanied by shaking, stirring, or otherwise mechanically agitating the mixture of the polymer in the oil. The temperature of the mixture may be set to facilitate the enhanced movement of the polymer in the oil medium (e.g., about 60° F. to about 80° F.).

After the polymer has been in contact with the partially refined oil for a purification period, it may be separated from the refined oil 212. The polymer may be separated by centrifugation, filtration, and/or decantation. among other methods. The refined oil may then be used for an end use application, such as cooking oil, edible oil, mechanical oil, heating oil, ethanol production, oleochemical production, and/or biodiesel production, among other applications.

The impurity containing polymer that is separated from the refined oil may be disposed of by conventional methods, recycled for additional purification processes and/or incorporated into economically valuable materials, among other options. In the embodiment shown in FIG. 2, the polymer is permanently disposed 214, for example by depositing into a landfill.

Exemplary Refining Systems

Figure 3:
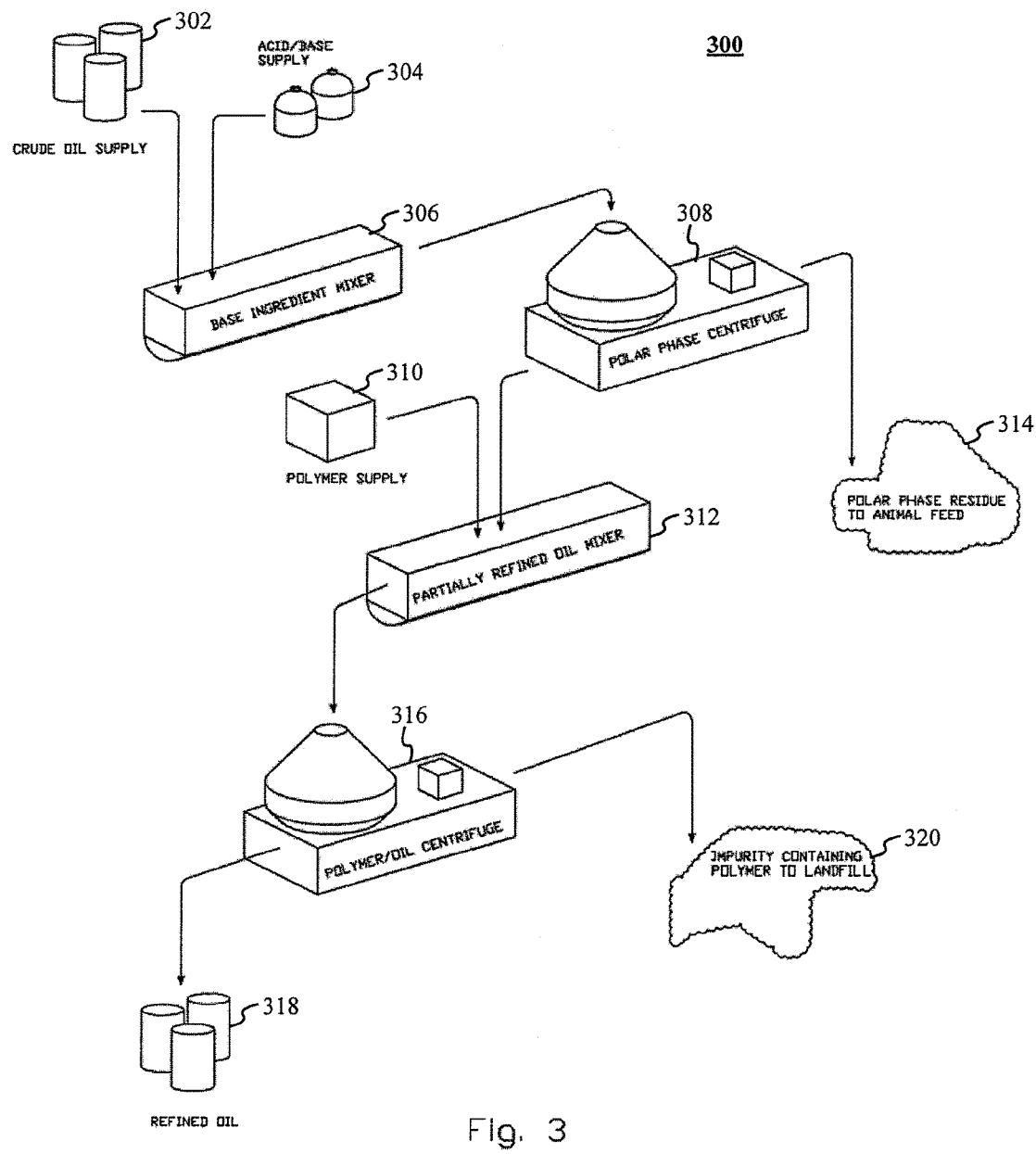
FIG. 3 shows a simplified schematic diagram of a system to refine a renewable oil according to embodiments of the invention.

FIG. 3 shows a simplified schematic of an exemplary refining system 300 according to embodiments of the invention. The system 300 includes a crude oil supply 302 that may be combined with an acid/base supply 304 into a base ingredient mixer 306. Following the combination and mixing of the crude oil and acid/base supply, the mixture may be transferred to a polar phase centrifuge 308 where a polar aqueous phase is separated from a non-polar oil phase.

The impurities contained in the polar aqueous phase may be removed from the centrifuge 308 and incorporated into animal feed 314. The non-polar, oil phase may be combined with polymer supply 310 in a partially refined oil mixer 312. After the polymer and oil phase are sufficiently mixed, the mixture may be transferred to the polymer/oil centrifuge 316 to separate the impurity-containing polymer from the refined oil 318. As noted above, the separated polymer may be removed from the centrifuge 316 and permanently disposed of as landfill waste 320.

EXPERIMENTAL

Refining a Crude Corn Oil

In this experimental example, a crude corn oil is refined according to an embodiment of the present process to make a refined corn oil. 800 ml of unrefined corn oil is heated to a temperature range of 60-80° F. and centrifuged. 8 ml of 0.1% aqueous phosphoric acid is added to the corn oil, and the oil and acid mixture are stirred at a mixing speed of about 800-1000 rpm. The mixture is stirred for 8-10 minutes while the temperature is maintained about 160-170° F.

Next, an aqueous sodium hydroxide solution is added to the partially degummed corn oil to break down non-hydratable lipids and extract FFAs from the oil. The concentration of the sodium hydroxide is about 10% (e.g., about 1.5 grams of NaOH per 100 ml of corn oil). The oil and an aqueous phases are constantly stirred for about 5-8 minutes or until the oil starts to change color and/or a soap stock of FFAs, lipids, gums, phospholipids, etc., start to settle out of the liquid). When the soap stock has separated from the corn oil, it is centrifuged to remove it from the partially refined corn oil. The extracted soap stock constitutes about 10 wt. % of the mixture.

The partially refined corn oil is examined to see if enough excess moisture is still present to recommend a vacuum drying step to remove additional water. Following the vacuum drying, the partially refined corn oil is adjusted to about 60-80° F. while being stirred. The stirring time is selected so that the remaining FFAs in the oil do not start to float or settle in the oil. While the oil is being stirred, about 8 grams of dry polyvinylpyrrolidone (PVP) polymer (commercially sold under the tradename Polyclar®) is added to the oil. The amount of PVP polymer was selected to be about 0.2% (i.e., 0.002 grams per milliliter of oil) for these experimental runs. Following the addition of the polymer, the oil was centrifuged while maintaining the 60-80° F. temperature to separate the polymer from the refined corn oil.

Concentrations of FFAs are measured for both the crude corn oil and the refined corn oil produced at the end of the refining process. The measurements shown that the FFAs in the crude corn oil were 11.48 wt. %, while refined corn oil has only 0.70 wt. % FFAs, a reduction of over 86%.

Converting Refined Corn Oil to Biodiesel

Biodiesel may be produced by a reaction between an oil and an alcohol. Vegetable oils and animal fats are the primary feedstocks currently used to produce biodiesel. Vegetable oils and animal fats include triglycerides, a class of molecules having a 3-carbon backbone. The triglycerides may react with three alcohol molecules to form a glycerin molecule and three molecules of biodiesel, which are also known as fatty esters.

Many renewable oils include triglycerides, diglycerides, monoglycerides and/or free fatty acids (FFAs). The FFAs are often produced by the degradation of the higher-glycerides (e.g., the FFA breaks away from a triglyceride). Under prolonged exposure to heat, triglycerides will degrade into di- and mono-glycerides, eventually producing up to three FFAs.

When the renewable oil has even as little as 1-2 wt. % FFAs, they can cause difficulties with biodiesel production and purification. While some biodiesel production processes can convert FFAs to biodiesel using acid-catalyzed esterification reactions, many efficient production processes lack this ability. The heavy use of strong acids in acid-catalyzed processes significantly increases biodiesel production costs, as well as creates substantial amounts of additional wastes. For many non-acid-catalyzed processes, the FFAs react with a portion of a base catalyst to create soap. If the concentration of FFAs is sufficiently high, most or all the base catalyst is converted into soap, halting production of the biodiesel. Moreover, the soap can contaminate the biodiesel that is produced, required additional purification steps before the biodiesel can be used.

As noted above, the concentration of the FFAs in the refined corn oil was less than 1 wt. % (i.e., 0.7 wt %) making the oil acceptable for conventional, base-catalyzed biodiesel production. The biodiesel produced from the refined corn oil measured low levels of particulates using the cold soak filtration test for biodiesel fuels. The cold soak filtration test measures the time (in seconds) it takes for a cold soaked sample of the biodiesel fuel to pass through two 0.8 µm filters, as well as the particulate matter retained on the filters. The samples of biodiesel produced from the refined corn oil descried above had a cold soak time of 121 seconds and an amount of particulates that was well below the threshold for commercially acceptable biodiesel fuels.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the polymer" includes reference to one or more polymers and equivalents thereof known to those skilled in the art, and so forth.

Also, the words "comprise", "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A process of refining a renewable oil, the process comprising:
   providing a renewable oil;
   adding one or more compounds to the renewable oil to produce a soap stock in the renewable oil comprising:
      adding an acid to the renewable oil, and
      increasing the pH of the acidified renewable oil by adding a base to the acidified renewable oil;
   separating at least a portion of the soap stock from the renewable oil to produce a partially purified renewable oil;
   adding a polymer to the partially purified renewable oil; and
   separating at least a portion of the polymer from the partially purified renewable oil to produce a refined renewable oil, wherein:
      the renewable oil has a temperature ranging from 60° F. to 80° F. when the acid is added to the renewable oil,
      the polymer comprises polyvinyl polypyrrolidone,
      the soap stock is formed by the addition of the base,
      the partially purified renewable oil is non-polar,
      the process of refining the renewable oil occurs prior to reacting the refined renewable oil with alcohol to form a biodiesel compound, and
      free fatty acids comprise less than 1 wt. % of the refined renewable oil.

2. The process of claim 1, wherein the renewable oil comprises a vegetable oil or an animal oil.

3. The process of claim 1, wherein the base comprises a strong base.

4. The process of claim 1, wherein the acidified renewable oil has a temperature of about 160° F. to about 170° F. when the base is added to the acidified renewable oil.

5. The process of claim 1, wherein the step of separating the soap stock from the renewable oil comprises centrifuging the renewable oil.

6. The process of claim 1, wherein the process further comprises removing at least a portion of water from the renewable oil that has been separated from the soap stock.

7. The process of claim 6, wherein the step of removing at least a portion of the water from the renewable oil comprising vacuum drying the renewable oil.

8. The process of claim 1, wherein the process further comprises centrifuging the renewable oil to separate solids comprising the polymer from the refined renewable oil, and removing the solids from the refined renewable oil.

9. The process of claim 8, wherein the solids comprising the polymer are incorporated into animal feed.

10. A process for refining a renewable oil, the process comprising:
   providing a renewable oil comprising an amount of free fatty acids;
   removing a first portion of free fatty acids from the renewable oil to produce a partially refined oil; and
   removing a second portion of free fatty acids from the partially refined oil to produce a refined renewable oil, wherein:
      the partially refined oil is non-polar,
      the removal of the second portion of free fatty acids comprises adding a polymer to the partially refined oil, maintaining the temperature of the partially refined oil from 60° F. to 80° F., and, then, separating at least a portion of the polymer from the partially refined oil,
      the polymer is insoluble in the partially refined oil,
      the process of refining the renewable oil occurs prior to reacting the refined renewable oil with alcohol to form a biodiesel compound, and
      the sum of the first portion of free fatty acids and the second portion of free fatty acids comprises greater than 86% of the amount of free fatty acids.

11. The process of claim 10, wherein the step of removing the first portion of the free fatty acids from the starting renewable oil comprises:
   adding one or more compounds to the starting renewable oil to produce a soap stock, wherein the soap stock comprises reaction products of the free fatty acids; and
   separating at least a portion of the soap stock to produce the partially refined oil.

12. A process of refining a renewable oil with an edible polymer, the process comprising:
   providing a renewable oil, wherein the renewable oil is non-polar;
   adding an edible polymer to the renewable oil, wherein:
      the edible polymer comprises a powder phase and the renewable oil is at a temperature from 60° F. to 80° F. when the edible polymer is added, and
      the edible polymer is insoluble in the renewable oil;
   binding at least a portion of free fatty acids in the renewable oil to the edible polymer; and
   separating at least a portion of the edible polymer from the renewable oil, wherein:
      the process of refining the renewable oil with the edible polymer occurs prior to reacting the renewable oil with alcohol to form a biodiesel compound, and
      free fatty acids comprise less than 1 wt. % of the renewable oil prior to reacting the renewable oil with alcohol to form the biodiesel compound.

13. The process of claim 12, wherein the process further comprises incorporating the edible polymer extracted from the renewable oil into animal feed.

14. The process of claim 1, wherein separating at least a portion of the polymer from the partially purified renewable oil to produce a refined renewable oil comprises filtering or decanting.

15. The process of claim 1, further comprising:
   binding at least a portion of free fatty acids in the renewable oil to the polymer, and
   wherein the polymer comprises a first material and a second material, wherein:
      the first material has a strong binding affinity to free fatty acids, and
      the second material has a strong binding affinity to non-hydratable phosphatides.

16. The process of claim 15, wherein the process further comprises:
   adding the first material to the partially purified renewable oil;
   separating a portion of the first material from the partially purified renewable oil; and
   adding the second material to the partially purified renewable oil after separating the portion of the first material from the partially purified renewable oil.

17. The process of claim 1, wherein the temperature of the partially purified renewable oil is maintained in a range from 60° F. to 80° F. while the polymer is mixed with the partially purified renewable oil.

18. The process of claim 10, wherein the polymer comprises polyvinyl polypyrrolidone.

19. The process of claim 12, wherein the edible polymer comprises polyvinyl polypyrrolidone.

20. The process of claim 19, wherein the portion of free fatty acids comprises pamitic acid, stearic acid, caproic acid, caprylic acid, capric acid, lauric acid, myristic acid, behenic acid, or butyric acid.

21. The process of claim 19, wherein the portion of free fatty acids comprises a saturated fatty acid.

* * * * *